US012066869B2

(12) United States Patent
Vassberg

(10) Patent No.: US 12,066,869 B2
(45) Date of Patent: Aug. 20, 2024

(54) ACCESSORY DEVICE WITH DUAL ANGLE SETTING USING A SINGLE FULCRUM POINT

(71) Applicant: Apple Inc., Cupertino, CA (US)

(72) Inventor: Dylan L. Vassberg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 17/026,100

(22) Filed: Sep. 18, 2020

(65) Prior Publication Data
US 2022/0091640 A1    Mar. 24, 2022

(51) Int. Cl.
*G06F 1/16* (2006.01)
*A45C 11/00* (2006.01)

(52) U.S. Cl.
CPC ............ *G06F 1/1669* (2013.01); *A45C 11/00* (2013.01); *G06F 1/1632* (2013.01); *A45C 2011/003* (2013.01); *A45C 2200/15* (2013.01)

(58) Field of Classification Search
None
See application file for complete search history.

(56) References Cited

U.S. PATENT DOCUMENTS

| | | | | |
|---|---|---|---|---|
| 8,807,333 B1* | 8/2014 | Cooper | ............... | G06F 1/1656 206/320 |
| 9,261,910 B2* | 2/2016 | Liang | .................... | G06F 1/1632 |
| 9,456,674 B2 | 10/2016 | Huang | | |
| 9,654,165 B2 | 5/2017 | Cho et al. | | |
| 9,851,748 B2* | 12/2017 | Senatori | ................ | G06F 1/1679 |
| 9,918,534 B2* | 3/2018 | Säilä | ....................... | A45C 11/00 |
| 10,595,604 B1* | 3/2020 | de la Fuente | ......... | G06F 1/1669 |
| 10,664,012 B1* | 5/2020 | Zimmerman | ........... | H04M 1/04 |
| 10,725,722 B1* | 7/2020 | Koelmel | ............... | G06F 1/1649 |
| 2006/0007645 A1* | 1/2006 | Chen | .................... | G06F 3/0202 361/679.04 |
| 2012/0293953 A1* | 11/2012 | Wu | ....................... | A45C 11/00 361/679.56 |
| 2014/0240923 A1* | 8/2014 | Lin | ......................... | G06F 1/203 361/679.55 |
| 2014/0328019 A1* | 11/2014 | Liang | .................... | G06F 1/1632 361/679.55 |

(Continued)

OTHER PUBLICATIONS

Zugucase: "The Muse", https://www.zugucase.com/; 7 pages; retrieved on Aug. 7, 2020.

*Primary Examiner* — Xanthia C Relford
(74) *Attorney, Agent, or Firm* — BAKERHOSTETLER

(57) ABSTRACT

An accessory device designed to receive and carry a portable electronic device is disclosed. The accessory device may include a first section having multiple segments configurable in different manners to form at least two different support angles, thereby supporting the portable electronic device in at least two different angles. Further, the accessory device may include an additional second section rotationally coupled to the first section. The second section may include one or more input mechanisms (e.g., keyboard, trackpad), as well as a magnetic assembly that magnetically couples with a device magnet (or device magnets) in the portable electronic device. The magnetic assembly defines a pivot point, or fulcrum, that allows the portable electronic device to rotate from the first angle to the second angle, or vice versa. The pivot point (defined by the magnetic assembly) removes the need for multiple, additional rows of magnets.

18 Claims, 13 Drawing Sheets

(56) References Cited

U.S. PATENT DOCUMENTS

| | | | |
|---|---|---|---|
| 2014/0340829 A1* | 11/2014 | Matsumoto | G06F 1/1654 |
| | | | 361/679.27 |
| 2015/0049423 A1* | 2/2015 | Hsu | G06F 3/0202 |
| | | | 361/679.09 |
| 2015/0055284 A1* | 2/2015 | Han | F16M 11/38 |
| | | | 361/679.12 |
| 2015/0263776 A1* | 9/2015 | Shyu | A45C 13/002 |
| | | | 455/575.8 |
| 2016/0154428 A1* | 6/2016 | Senatori | G06F 1/1662 |
| | | | 361/679.27 |
| 2016/0323002 A1* | 11/2016 | Cho | H04B 1/3888 |
| 2016/0349794 A1* | 12/2016 | Yeh | G06F 3/0426 |
| 2017/0068286 A1* | 3/2017 | Esmaeili | H01R 13/6205 |
| 2017/0192455 A1* | 7/2017 | Kim | G06F 1/1628 |
| 2017/0280842 A1* | 10/2017 | Säilä | A45C 11/00 |
| 2018/0364769 A1* | 12/2018 | Esmaeili | G06F 1/1684 |
| 2019/0294212 A1* | 9/2019 | Ohishi | G06F 1/1669 |
| 2020/0081489 A1* | 3/2020 | Stryker | G06F 1/1681 |
| 2020/0097045 A1* | 3/2020 | Claudepierre | H04M 1/72409 |
| 2020/0097050 A1* | 3/2020 | Robinson | G06F 1/1681 |
| 2020/0166973 A1* | 5/2020 | Kang | G06F 1/1681 |
| 2020/0285279 A1* | 9/2020 | Zimmerman | G06F 3/0383 |

* cited by examiner

ACCESSORY DEVICE WITH DUAL ANGLE SETTING USING A SINGLE FULCRUM POINT

FIELD

The following description relates to accessory devices suitable for use with portable electronic devices. In particular, the following description relates to accessory devices that are adjustable to present portable electronic devices at various angles, while maintaining a single fulcrum, or pivot point, for the portable electronic device to rotate about, to the various angles.

BACKGROUND

Accessory devices can be used with electronic devices. Typically, the angle at which the electronic device is positioned is based upon manufacturer specification of the accessory device. However, some accessory devices allow a user to adjust the angle of presentation of the electronic device. These accessory devices commonly require multiple channels, troughs, or other mechanical features designed to receive the electronic device, with each channel representing a different angle/orientation of the electronic device. Moreover, each angle/orientation requires a separate row of magnets to support the electronic device at that particular angle. Accordingly, the design modifications for accessory devices to allow the user to position an electronic device at different angles require additional materials (e.g., magnets), resulting in an accessory device additional weight and cost, neither of which are generally desirable.

SUMMARY

In one aspect, an accessory device suitable for use with an electronic device is described. The accessory device may include a first section configured to support the electronic device and provide a first support angle and a second support angle different from the first support angle. The accessory device may further include a second section rotationally coupled with the first section. The second section may include a magnetic assembly configured to magnetically couple with a magnet of the electronic device at the first support angle and the second support angle.

In another aspect, an accessory device suitable for use with an electronic device is described. The accessory device may include a first section configured to support the electronic device and provide a first support angle and a second support angle different from the first support angle. The accessory device may further include a second section rotationally coupled with the first section. The second section may include a magnetic assembly configured to magnetically couple with a magnet of the electronic device and define a pivot. In some exemplary embodiments, the second section allows the electronic device to rotate, based on the pivot, from the first support angle to the second support angle.

In another aspect, an accessory device suitable for use with an electronic device is described. The accessory device may include a first section configured to support the electronic device and provide a first support angle and a second support angle different from the first support angle. The first section may include a first segment that defines a first size. The first section may further include a second segment rotationally coupled to the first segment by a first hinge. The second segment may define a second size different from the first size. The first section may further include a third segment rotationally coupled to the second segment by a second hinge. The third segment may define a third size different from the first size and the second size. The accessory device may further include a second section rotationally coupled with the first section. The second section may include a magnetic assembly that magnetically couples with a magnet of the electronic device at the first support angle and the second support angle.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
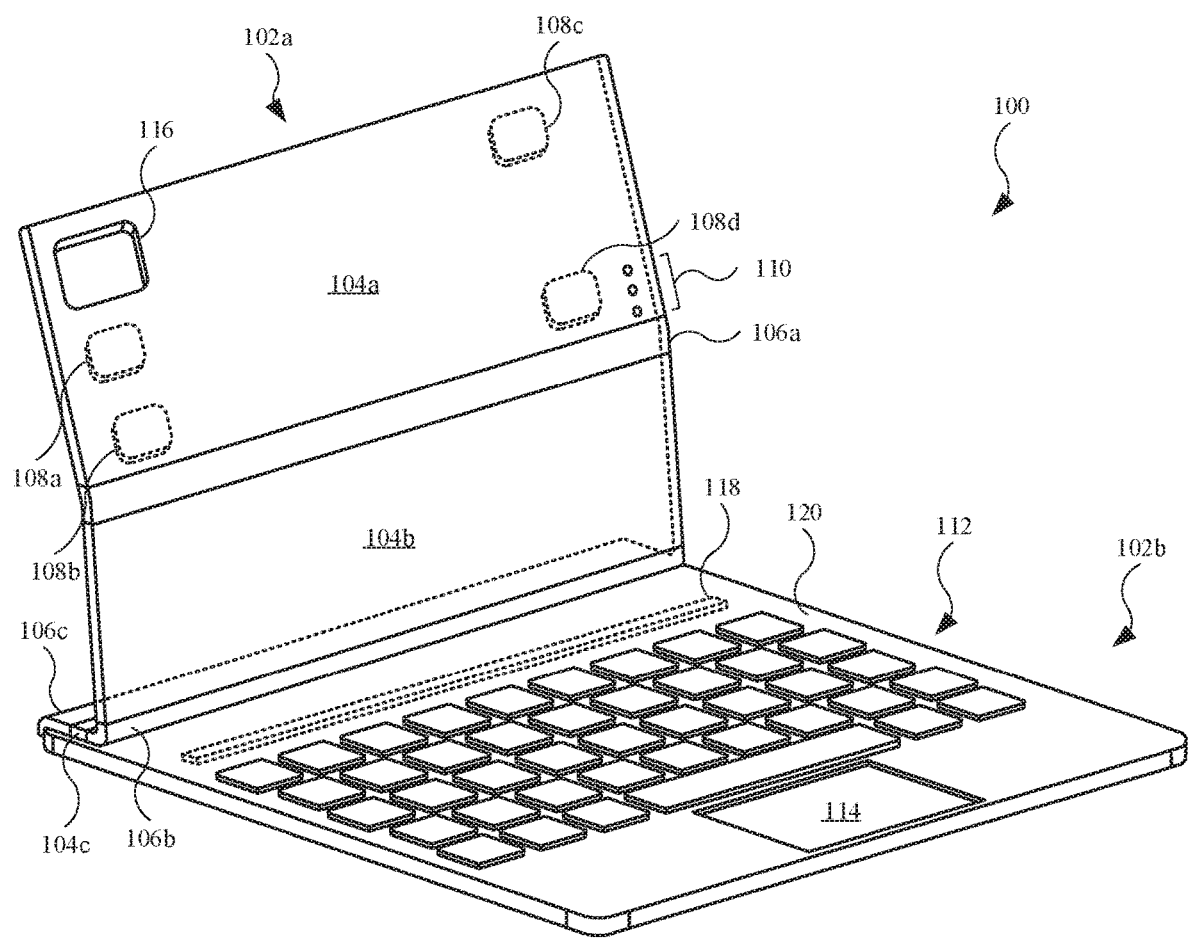
FIG. 1 illustrates an isometric view of an embodiment of an accessory device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory devices for use with portable electronic devices, such as mobile wireless communication devices (e.g., tablet computing devices and smartphones). Accessory devices described herein are designed to position/orient a portable electronic device at different angles, depending on user preference. In some exemplary embodiments, an edge or side region of the portable electronic device lies on a surface of the accessory devices, and the point/location of contact on which the edge or side region of the portable electronic device is positioned on the surface of the accessory device defines a pivot/rotation location. The pivot/rotation location acts as a fulcrum about which the portable electronic device can rotate to the different angles allowed by the accessory device.

In some exemplary embodiments, the accessory device includes multiple sections, such as a first section and a second section. The first section may include a segmented cover having multiple segments and flexible fabrics (acting as hinges) positioned between adjacent segments. In this manner, the segments can be positioned in different ways to orient the portable electronic device at different angles. The second section may include input mechanisms (e.g., keyboard, trackpad) used to provide inputs/commands/gestures to the portable electronic device. Additionally, the second section may include a magnetic assembly that magnetically couples with magnets located in the portable electronic device, or alternatively, with magnets located in a case that carries the portable electronic device. Although the magnetic assembly in the second section forms a magnetic coupling with the magnets in the portable electronic device, the portable electronic device can nonetheless rotate relative to the second section in order to position the portable electronic device at different angles. In this regard, the location of the magnetic assembly can define the pivot/rotation location provided by the accessory device. Additionally, in a closed position (in which the portable electronic device is covered by both the first and second sections), the magnetic assembly can magnetically couple with an additional magnet(s) in the portable electronic device in order to increase retention forces between the portable electronic device and the accessory device, i.e., to keep the accessory device secured with the portable electronic device. The relationships described between the magnets in the accessory device and portable electronic device may also be present between the magnets in the accessory device and a case that carries the portable electronic device.

The magnetic assembly in accessory devices described herein provides several advantages over traditional accessory devices. For example, while traditional accessory devices may support a portable electronic device at different angles, these accessory devices have multiple arrays of magnets (one for each angle), whereas accessory devices described herein only require a single array/row of magnets and still support the portable electronic device at multiple angles. Further, at least some traditional accessory devices require channels/troughs to mechanically support the portable electronic device at different angles, several exemplary accessory devices described herein require no channels/trough to mechanically engage a portable electronic device. Rather, the magnetic assemblies in accessory devices described herein provide sufficient magnetic attraction force to limit unwanted movement/sliding of the portable electronic device, while also permitting rotational movement of the portable electronic device on a generally flat surface of the accessory device. However, in order to provide at least some mechanical retention to the portable electronic device, it should be noted that in some exemplary embodiments, a channel/trough could be integrated into a section of the accessory device that covers/overlays the magnetic assembly.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 illustrates an isometric view of an embodiment of an accessory device 100. Accessory device 100 may be suitable for use in conjunction with electronic devices (not shown in FIG. 1), including portable electronic devices such as mobile wireless communication devices (e.g., tablet computing devices and smartphones). In this regard, accessory device 100 may be referred to as a folio, a case, or a cover (as non-limiting examples).

As shown, accessory device 100 includes a section 102*a* and a section 102*b*. Sections 102*a* and 102*b* may be referred to as a first section and a second section, respectively. Alternatively, sections 102*a* and 102*b* may be referred to as a cover and a base, respectively. Section 102*a* may include a segment 104*a*, a segment 104*b*, and a segment 104*c*. Segments 104*a*, 104*b*, and 104*c* may be referred to as a first segment, a second segment, and a third segment, respectively. In order to provide relative movement to segments 104*a*, 104*b*, and 104*c*, section 102*a* may include a hinge between segments 104*a*, 104*b*, and 104*c*. For example, section 102*a* includes a hinge 106*a* joined with, and between, segments 104*a* and 104*b*, as well as a hinge 106*b* joined with, and between, segments 104*b* and 104*c*. Hinges 106*a* and 106*b* allow movement/rotation of segments 104*a*, 104*b*, and 104*c* relative to each other. Additionally, accessory device 100 includes a hinge 106*c* (secured with segment 104*c*) that connects section 102*a* with section 102*b*, thereby allowing movement/rotation of sections 102a and 102b relative to each other. In some embodiments, hinge 106c is removable from section 102b by way of magnetic coupling and de-coupling, or hook and loop fasteners (e.g., VELCRO®), as non-limiting examples. In the embodiment shown in FIG. 1, hinge 106c is permanently secured with section 102b by adhesives, fasteners, and/or sewing, as non-limiting examples. While segments 104a, 104b, and 104c are generally rigid or stiff and resist bending, hinges 106a, 106b, and 106c are generally flexible. In some embodiments, segments 104a, 104b, and 104c include one or more polycarbonate layers, and hinges 106a, 106b, and 106c include one or more layers of flexible fabric.

In order to secure an electronic device with accessory device 100, accessory device 100 may include several magnets. For example, section 102a includes a magnet 108a, a magnet 108b, a magnet 108c, and a magnet 108d. Magnets 108a, 108b, 108c, and 108d may each represent one or more magnets. Also, while magnets 108a, 108b, 108c, and 108d are shown as being embedded in segment 104a, in some exemplary embodiments, at least one of magnets 108a, 108b, 108c, or 108d may be embedded in segment 104b.

In order to use features of the electronic device, accessory device 100 includes several integrated features. For example, section 102a includes electrical contacts 110 located on segment 104a. Electrical contacts 110 are designed and positioned on section 102a to electrically couple with corresponding electrical contacts located on an electronic device. While electrical contacts 110 are positioned on segment 104a at a particular location, electrical contacts 110 may generally be positioned at any location on segment 104a corresponding to the location of electrical contacts (not shown in FIG. 1) on the electronic device. Moreover, in some embodiments (not shown), electrical contacts 110 are located on segment 104b or section 102b, based on a corresponding location of electrical contacts on the electronic device. When accessory device 100 is electrically coupled to an electronic device, several input mechanisms can be used to provide inputs, controls, or gestures to the electronic device. For example, section 102b includes a keyboard 112 and a trackpad 114, both of which are capable of electrical communication, via the electrical contacts 110, with an electronic device when the electronic device is engaged with the section 102a. In some exemplary embodiments (not shown), accessory device 100 does not include electrical contacts 110, and instead, includes wireless communication circuitry for wireless communication in accordance with an industry standard, such as BLUETOOTH® (as a non-limiting example). Accordingly, in these embodiments, keyboard 112 and trackpad 114 are configured for wireless communication with the electronic device. Also, accessory device 100 includes an opening 116 (representing a through hole). When an electronic device secures with segment 104a, opening 116 is aligned with a camera assembly of the electronic device, thereby providing an unobstructed/unimpeded region in segment 104a for the camera assembly. While electrical contacts 110 and opening 116 are shown at a particular location on segment 104a, electrical contacts 110 and opening 116 may be positioned at a location corresponding to the location of electrical contacts and camera assembly, respectively, on the electronic device.

Also, accessory device 100 includes a magnetic assembly 118. As shown, magnetic assembly 118 is embedded in section 102b and covered by a surface 120 (representing an upper surface) of section 102b. Magnetic assembly 118 is designed and positioned to magnetically couple with device magnets located along an edge or side of the electronic device. This will be shown and described below. Magnetic assembly 118 may represent one or more magnets. When magnetic assembly 118 includes two or more magnets, the magnetic polarity of the magnets are arranged such that each magnet of magnetic assembly 118 magnetically couples with a corresponding magnet along the edge or side of the electronic device.

Figure 2:
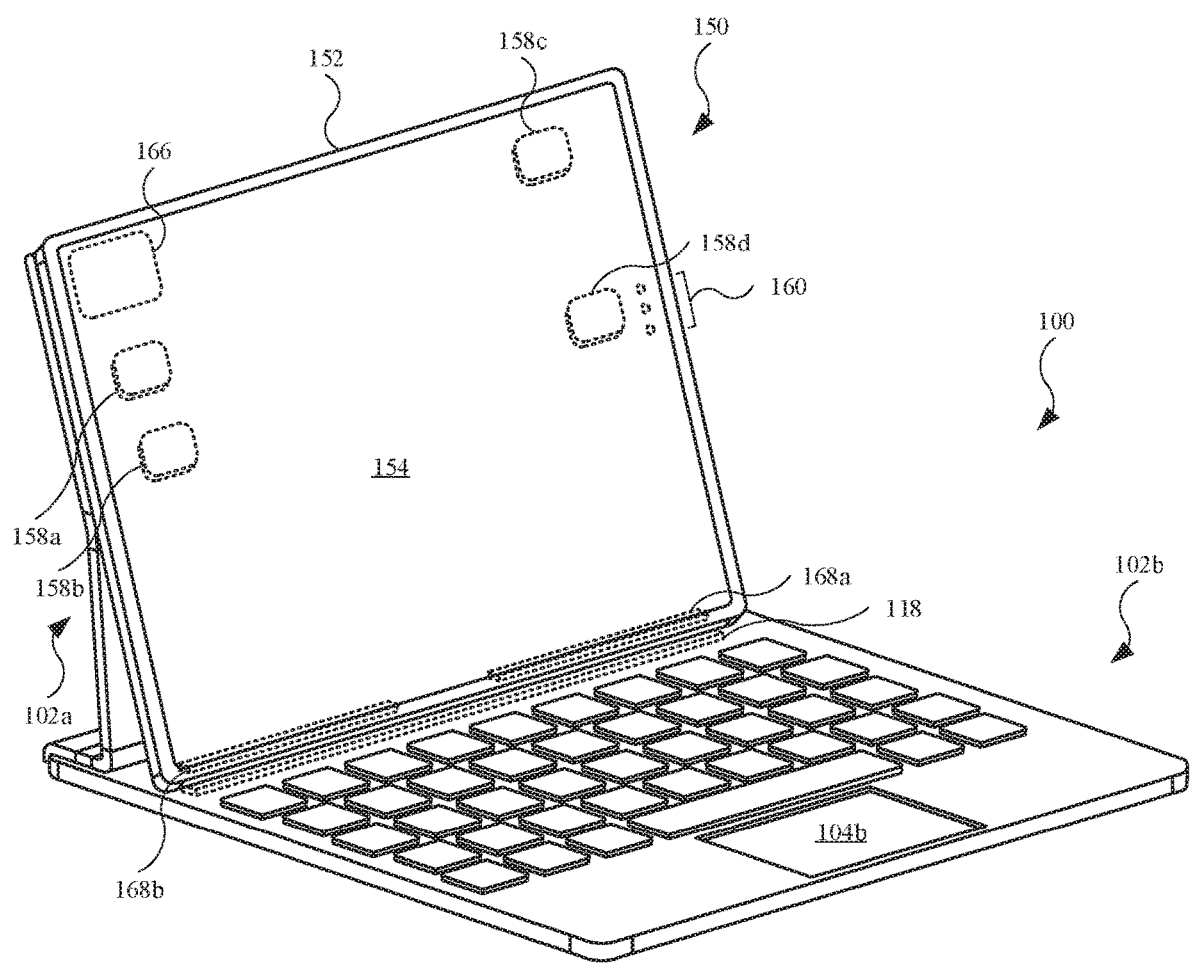
FIG. 2 illustrates an isometric view of the accessory device shown in FIG. 1, showing an electronic device used with the accessory device.

FIG. 2 illustrates an isometric view of accessory device 100 shown in FIG. 1, showing an electronic device 150 used with accessory device 100. Electronic device 150 includes a housing 152, or enclosure, designed to carry several components including, but not limited to, processing circuitry (central processing unit, graphics processing unit), memory circuits, batteries, speakers, microphones, and flexible circuitry (and/or cables) that electrically couple together the components. Electronic device 150 further includes a display assembly 154 designed to present textual information, still images, and motion images (e.g., video). Display assembly 154 may include a touch input display or touch screen.

Section 102a designed to couple with, and support, electronic device 150. In this regard, electronic device 150 includes a magnet 158a, a magnet 158b, a magnet 158c, and a magnet 158d. In the configuration shown in FIG. 2, magnets 158a, 158b, 158c, and 158d are magnetically coupled with magnets 108a, 108b, 108c, and 108d (shown in FIG. 1), respectively, of section 102a. Magnets 158a, 158b, 158c, and 158d may be referred to as device magnets or electronic device magnets, and magnets 108a, 108b, 108c, and 108d may be referred to as accessory device magnets. Also, each of magnets 158a, 158b, 158c, and 158d may represent one or more magnets. Electronic device 150 further includes electrical contacts 160 and a camera assembly 166. In the configuration shown in FIG. 2, electrical contacts 160 are electrically coupled with electrical contacts 110 (shown in FIG. 1), and camera assembly 166 is aligned with opening 116 (shown in FIG. 1).

Additionally, electronic device 150 includes a magnet 168a and a magnet 168b. Magnets 168a and 168b may each represent one or more magnets. In the configuration shown in FIG. 2, magnets 168a and 168b are each coupled with magnetic assembly 118 in section 102b. Magnets 168a and 168b may be referred to as device magnets, electronic device magnets, edge magnets, or side magnets, while magnetic assembly 118 may be referred to as an accessory device magnet or accessory device magnets, depending on the number of magnets.

Figure 3:
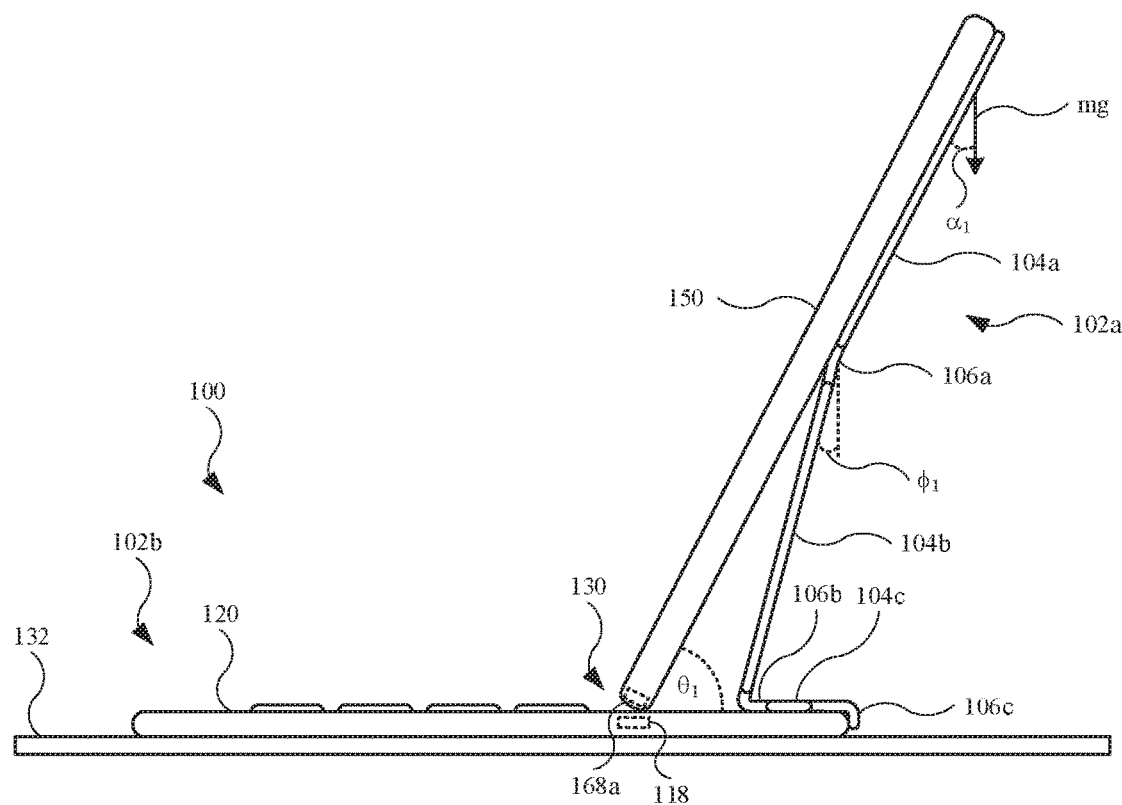
FIG. 3 illustrates a side view of the accessory device, showing the accessory device positioning the electronic device at an angle.
Figure 4:
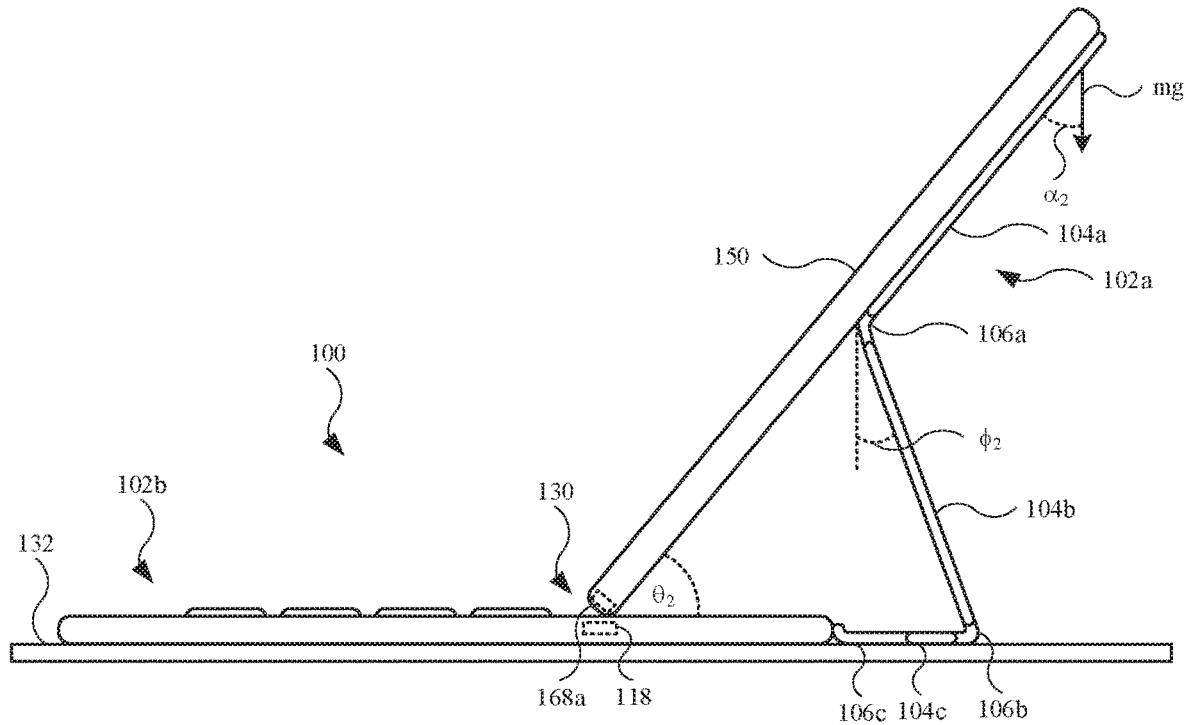
FIG. 4 illustrates a side view of the accessory device shown in FIG. 3, showing the accessory device positioning the electronic device at a different angle.
Figure 5:
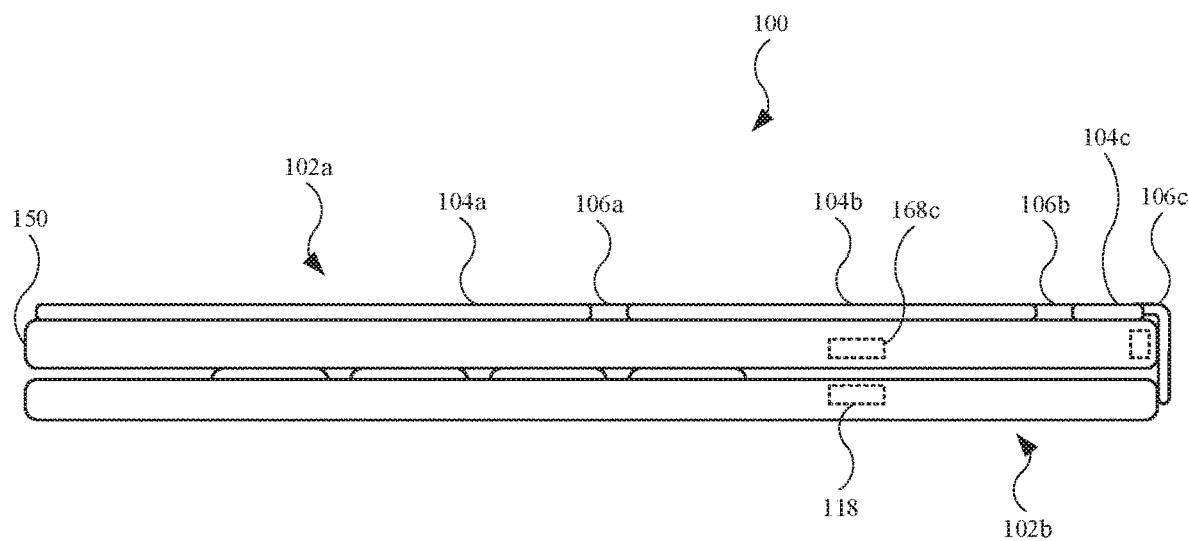
FIG. 5 illustrates a side view of the accessory device, showing the accessory device holding the electronic device in a closed configuration.

FIGS. 3-5 show and describe different modes/positions/configurations provided by accessory device 100 to hold/carry/support electronic device 150 in different orientations. Based on the different modes, accessory device 100 can provide a multi-functional accessory for electronic device 150. Further, FIGS. 3 and 4 show and describe two different open positions provided by accessory device 100 in which magnets 168a and 168b (shown in FIG. 2) of electronic device 150 magnetically couple with magnetic assembly 118 of accessory device 100.

FIG. 3 illustrates a side view of accessory device 100, showing accessory device 100 positioning electronic device 150 at an angle $\theta_1$. Angle $\theta_1$ may be approximately in the range of 55 to 75 degrees. In some embodiments, angle $\theta_1$ is 57.5 degrees, or at least approximately 57.5 degrees.

As shown, the components of section 102a are positioned to support electronic device 150 at angle $\theta_1$. For example, segment 104a can be rotated relative to segment 104b, or vice versa, using hinge 106a. In order for section 102a to provide sufficient stability and support the weight of electronic device 150, consideration of the position of segment 104b should be taken. For example, segment 104b is positioned at an angle θ₁ relative to an imaginary vertical line. Angle θ₁ may be approximately in the range of 7 to 15 degrees. In some embodiments, angle θ₁ is 9 degrees, or at least approximately 9 degrees. Additionally, in order for accessory device 100 to support electronic device at angle θ₁, segment 104c as well as hinges 106b and 106c are positioned on, or at least partially positioned on, section 102b.

Also, magnets 168a and 168b (not shown in FIG. 3) of electronic device 150 are magnetically coupled to magnetic assembly 118 of accessory device 100. The magnetic attraction force is between magnetic assembly 118 and magnets 168a and 168b is sufficient to prevent electronic device 150 from moving/sliding across surface 120 of section 102b. Accordingly, the magnetic attraction force between the magnets, $F_M$, may be greater than or equal the force of electronic device 150, $F_{D1}$, positioned at angle θ₁, such that $$F_M \geq F_{D1}. \tag{1}$$

The magnetic attraction force between the magnets, $F_M$, can be approximated by $$F_M = pq_1q_2/4\pi R^2 \tag{2}$$

where p is the permeability of the intervening medium, $q_1$ and $q_2$ are the respective magnitudes of magnetic poles of the magnets in electronic device 150 and magnets in accessory device 100, and R is the separation distance between the magnets in electronic device 150 and magnets in accessory device 100. The force of electronic device 150, $F_{D1}$, positioned at angle θ₁ can be approximated by $$F_{D1} = mg \cos(\alpha_1) \tag{3}$$

where m is the mass of electronic device 150, g is the acceleration due to gravity, and a1 is angle between electronic device 150 (or similarly, segment 104a) and a vertical line. It should be noted that the frictional forces provided by the material defining surface 120 of section 102b may also be considered.

Despite the magnetic attraction force between magnetic assembly 118 and magnets 168a and 168b, electronic device 150 can rotate/pivot relative to the section 102b. In this regard, the location of surface 120 that covers magnetic assembly 118 can define a pivot 130 at which electronic device 150 can be rotated from one support angle (e.g., angle θ₁ shown in FIG. 3) to another support angle (shown below) relative to the section 102b. Based in part upon the magnetic attraction force between magnetic assembly 118 and magnets 168a and 168b, electronic device 150 engages, and is held at, surface 120 in a location corresponding to the location of magnetic assembly 118, despite electronic device 150 rotating, at pivot 130, to different angles. Accordingly, pivot 130 may be referred to as a fulcrum, pivot point, pivot location, magnetic pivot point, or magnetic pivot location. It should be also noted that the magnetic attraction force between magnetic assembly 118 and magnets 168a and 168b is sufficient such that accessory device 100 need not be modified with additional mechanical features, such as interlocks or channels/troughs formed in section 102b.

FIG. 4 illustrates a side view of accessory device 100 shown in FIG. 3, showing accessory device 100 positioning electronic device 150 at an angle θ2 different from angle θ₁. As shown, accessory device 100 allows electronic device 150 to rotate, at pivot 130, from angle θ₁ shown (in FIG. 3) to angle θ₂. Angle θ₂ may be approximately in the range of 45 to 59 degrees. In some embodiments, angle θ₂ is 47.5 degrees, or at least approximately 47.5 degrees. Also, angles θ₁ and θ₂ may be referred to as a first angle and a second angle, respectively. Alternatively, angles θ₁ and θ₂ may also be referred to as a first support angle and a second support angle, respectively.

Although rearranged, the components of section 102a can nonetheless support electronic device 150 at angle θ₂. For example, segment 104a is again rotated relative to segment 104b, or vice versa, using hinge 106a. However, segment 104b is positioned at an angle θ₂ relative to an imaginary vertical line. Angle θ₂ may be approximately in the range of 12 to 25 degrees. In some embodiments, angle θ₂ is 20.5 degrees, or at least approximately 20.5 degrees. Additionally, in order for accessory device 100 to support electronic device at angle θ₂, segment 104c as well as hinges 106b and 106c are positioned on, or at least partially positioned on, a surface 132 (e.g., of a desk or table) on which accessory device 100 is also positioned. In other words, segment 104c as well as hinges 106b and 106c are positioned laterally with respect to section 102b. The phrase "positioned laterally" may include at least one of segment 104c and hinges 106b and 106c lying in-plane with section 102b. Whereas accessory device 100 supports electronic device 150 at angle θ₁ (shown in FIG. 3) by placing segment 104c as well as hinges 106b and 106c on section 102b and not surface 132, accessory device 100 supports electronic device 150 at angle θ₂ by placing segment 104c as well as hinges 106b and 106c on surface 132 and not section 102b.

The magnetic attraction force between the magnets, $F_M$, may also be greater than or equal the force of electronic device 150, $F_{D2}$, positioned at angle θ₂ can be approximated by, such that $$F_M \geq F_{D2}. \tag{4}$$

The force of electronic device 150, $F_{D2}$, positioned at angle θ₂ can be approximated by $$F_{D2} = mg \cos(\alpha_2) \tag{5}$$

where m is the mass of electronic device 150, g is the acceleration due to gravity, and $\alpha_2$ is angle between electronic device 150 (or similarly, segment 104a) and a vertical line.

While the location of some components differ based on angles θ₁ and θ₂ shown in FIGS. 3 and 4, respectively, magnets 168a and 168b (shown in FIG. 2) of electronic device 150 are nonetheless magnetically coupled to magnetic assembly 118 of accessory device 100 during the transition from angle θ₁ to angle θ₂, or vice versa, and pivot 130 is maintained. Moreover, despite the magnetic attraction force (which generally limits or prevents movement) between magnetic assembly 118 and magnets 168a and 168b, accessory device 100 allows rotation of electronic device 150 at pivot 130. As a result, magnetic assembly 118, which at least partially defines pivot 130, can represent a single row of magnets in section 102b. Accordingly, accessory device 100 does not require two different/separate rows of magnets to place electronic device 150 at two different angles, i.e., angles θ₁ and θ₂. Advantageously, accessory device 100 requires fewer parts, which may reduce not only the total manufacturing costs and assembly time, but also the weight (of accessory device 100).

FIGS. 3 and 4 represent different open configurations of accessory device 100. However, accessory device 100 can be reconfigured to provide additional protection to electronic device 150, particularly when electronic device 150 is not in use. For example, FIG. 5 illustrates a side view of accessory device 100, showing the accessory device 100 holding electronic device 150 in a closed configuration. As shown, sections 102a and 102b combine to cover, or at least substantially cover, major (e.g., front and back) surfaces of electronic device 150. In this regard, hinges 106a, 106b, and 106c allow sufficient flexibility such that segments 104a, 104b, and 104c cover and rest on a back surface (defined by housing 152, shown in FIG. 2) of electronic device 150, while section 102b covers a front surface (defined by display assembly 154, shown in FIG. 2) of electronic device 150. Additionally, magnetic assembly 118 may be used to promote and maintain the closed configuration of accessory device 100. For example, electronic device 150 may include a magnet 168c (representing one or more magnets). As shown, magnet 168c magnetically couples with magnetic assembly 118 in the closed configuration. Although not shown, additional magnets in electronic device 150 may magnetically couple with additional magnets, respectively, in accessory device 100 to provide additional retention forces to support the closed configuration.

Figure 6:
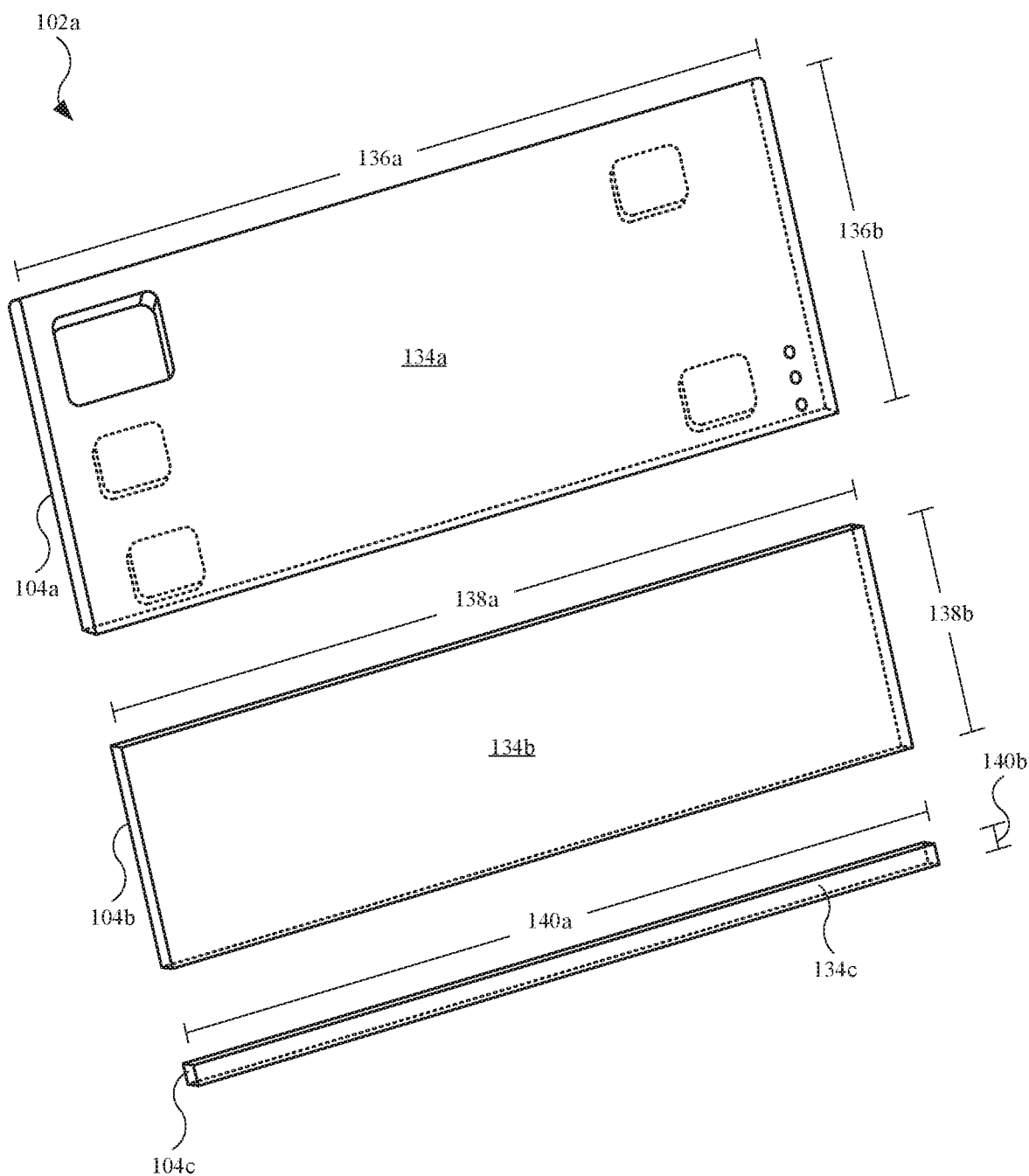
FIG. 6 illustrates an isometric view of the segments of the section, showing dimensional relationships of the segments, in accordance with some described embodiments.

FIG. 6 illustrates an isometric view of segments 104a, 104b, and 104c of the section 102a, showing dimensional relationships of segments 104a, 104b, and 104c, in accordance with some described embodiments. As shown, segments 104a, 104b, and 104c are rectangular segments with a major and minor dimension, where "major" refers to the longer of the two dimensions and "minor" refer to the shorter of the two dimensions. Segment 104a includes a surface 134a with a major dimension 136a and a minor dimension 136b, segment 104b includes a surface 134b with a major dimension 138a and a minor dimension 138b, and segment 104c includes a surface 134c with a major dimension 140a and a minor dimension 140b. While major dimensions 136a, 138a, and 140a are the same, or at least substantially similar, in length, minor dimensions 136b, 138b, and 140b differ. For instance, minor dimension 136b of segment 104a is longer/greater than minor dimension 138b of segment 104b, and minor dimension 138b of segment 104b is longer/greater than minor dimension 140b of segment 104c. Accordingly, minor dimension 136b of segment 104a is longer/greater than minor dimension 140b of segment 104c.

As a result of the aforementioned dimensional differences in minor dimensions 136b, 138b, and 140b, surfaces 134a, 134b, and 134c also differ in size. For example, surface 134a is larger (i.e., has a greater surface area) than surface 134b, and surface 134b is larger (i.e., has a greater surface area) than surface 134c. Accordingly, surface 134a is larger than surface 134c. In this manner, segment 104a is larger than segment 104b, and segment 104b is larger than segment 104c. Accordingly, segment 104a is larger than segment 104c. This disparate dimensional makeup of segments 104a, 104b, and 104c contribute to the multiple angles (i.e., angles $\theta_1$ and $\theta_2$ shown in FIGS. 3 and 4, respectively) that accessory device 100 can provide to electronic device 150.

FIGS. 7-10 show and describe alternate embodiments of accessory devices. The accessory devices shown and described in FIGS. 7-10 are designed to work in manner similar to that of accessory device 100 (shown in FIGS. 1-5), and accordingly, the accessory devices shown and described in FIGS. 7-10 include several structures and associated features similar to those shown and described for accessory device 100, while also provide alternative features.

Figure 7:
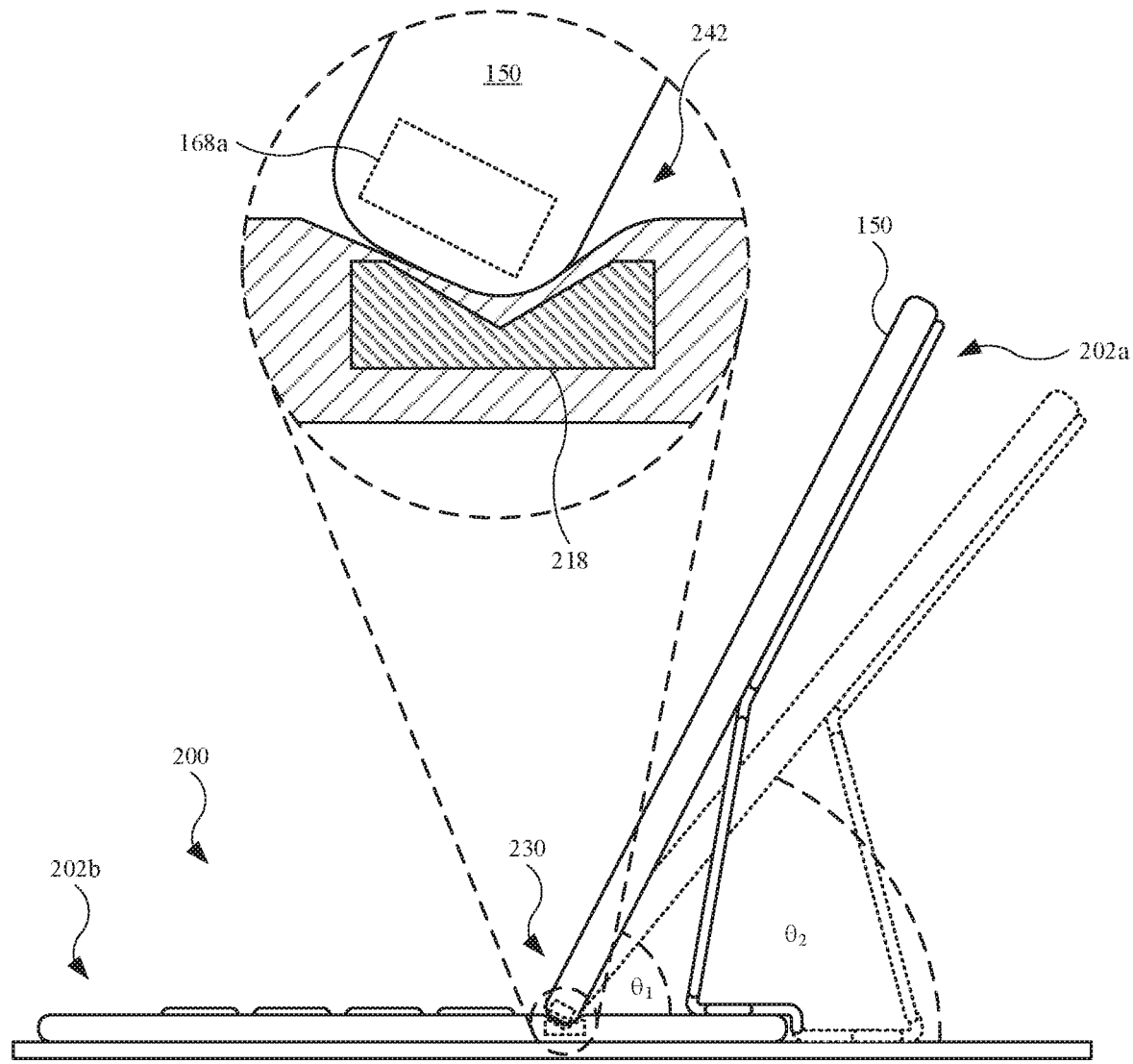
FIG. 7 illustrates an alternate embodiment of an accessory device, showing the accessory device having a channel that receives the electronic device.

FIG. 7 illustrates an alternate embodiment of an accessory device 200, showing accessory device having a channel 242 that receives the electronic device. As shown, accessory device 200 includes a section 202a and a section 202b designed to position electronic device 150 at angles $\theta_1$ and $\theta_2$ using a pivot 230. As shown in the enlarged view, channel 242 is formed into section 202b and is designed to receive electronic device 150. Channel 242 may include a trough or other sub-flush structure. Further, accessory device 200 includes a magnetic assembly 218 covered by channel 242, with magnetic assembly 218 magnetically coupling with magnets 168a and 168b (shown in FIG. 2). Channel 242 may provide a mechanical alteration that assists in maintaining electronic device 150 at pivot 230. Also, as shown, magnetic assembly 218 may be tapered to match a cross-sectional shape of channel 242.

Figure 8:
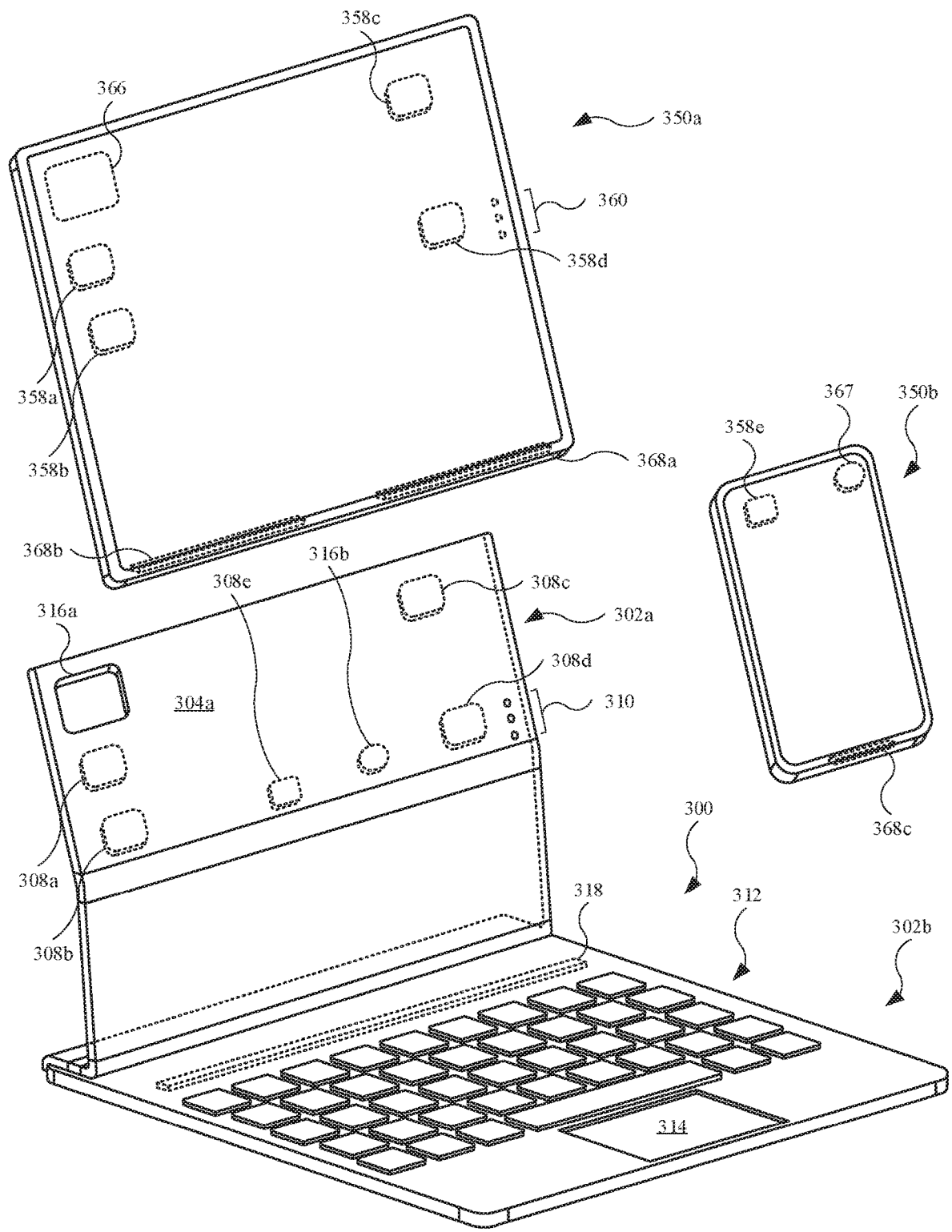
FIG. 8 illustrates an alternate embodiment of an accessory device, showing the accessory device modified for compatibility with multiple electronic devices.

FIG. 8 illustrates an alternate embodiment of an accessory device 300, showing accessory device 300 modified for compatibility with multiple electronic devices. As shown, accessory device 300 includes a section 302a and a section 302b. Section 302a includes several segments, including segment 304a. Section 302a further includes several magnets embedded in segment 304a. For instance, segment 304a holds a magnet 308a, a magnet 308b, a magnet 308c and a magnet 308d. Additionally, section 302b includes a magnetic assembly 318.

Accessory device 300 is designed for use with both an electronic device 350a and an electronic device 350b. In this regard, accessory device 300 can individually hold and support electronic devices 350a and 350b at different angles (e.g., angles $\theta_1$ and $\theta_2$ shown in FIGS. 3 and 4, respectively). For example, electronic device 350a includes a magnet 358a, a magnet 358b, a magnet 358c, and a magnet 358d designed to magnetically couple with magnets 308a, 308b, 308c, and 308d, respectively. Also, electronic device 350a includes a magnet 368a and a magnet 368b designed to magnetically couple with magnetic assembly 318 of accessory device 300. Moreover, segment 304a includes electrical contacts 310 capable of electrically coupling with electric contacts 360 of electronic device 350a. As a result, input mechanisms of accessory device 300, such as a keyboard 312 and a trackpad 314, can be used to provide inputs/comments/gestures to electronic device 350a. Further, segment 304a includes an opening 316a to accommodate a camera assembly 366 of electronic device 350a.

Additionally, segment 304a holds a magnet 308e designed to magnetically couple with a magnet 358e of electronic device 350b. Magnetic assembly 318 is further designed to magnetically couple with a magnet 368c of electronic device 350b. Further, segment 304a includes an opening 316b to accommodate a camera assembly 367 of electronic device 350b.

Based on the features shown and described for accessory device 300, accessory device 300 is suitable for use with electronic devices 350a and 350b. Moreover, electronic devices 350a and 350b may include different sizes and shapes, and provide different functionality. For example, electronic device 350a may generally be associated with a tablet computing device, while electronic device 350b may generally be associated with a smartphone.

Figure 9:
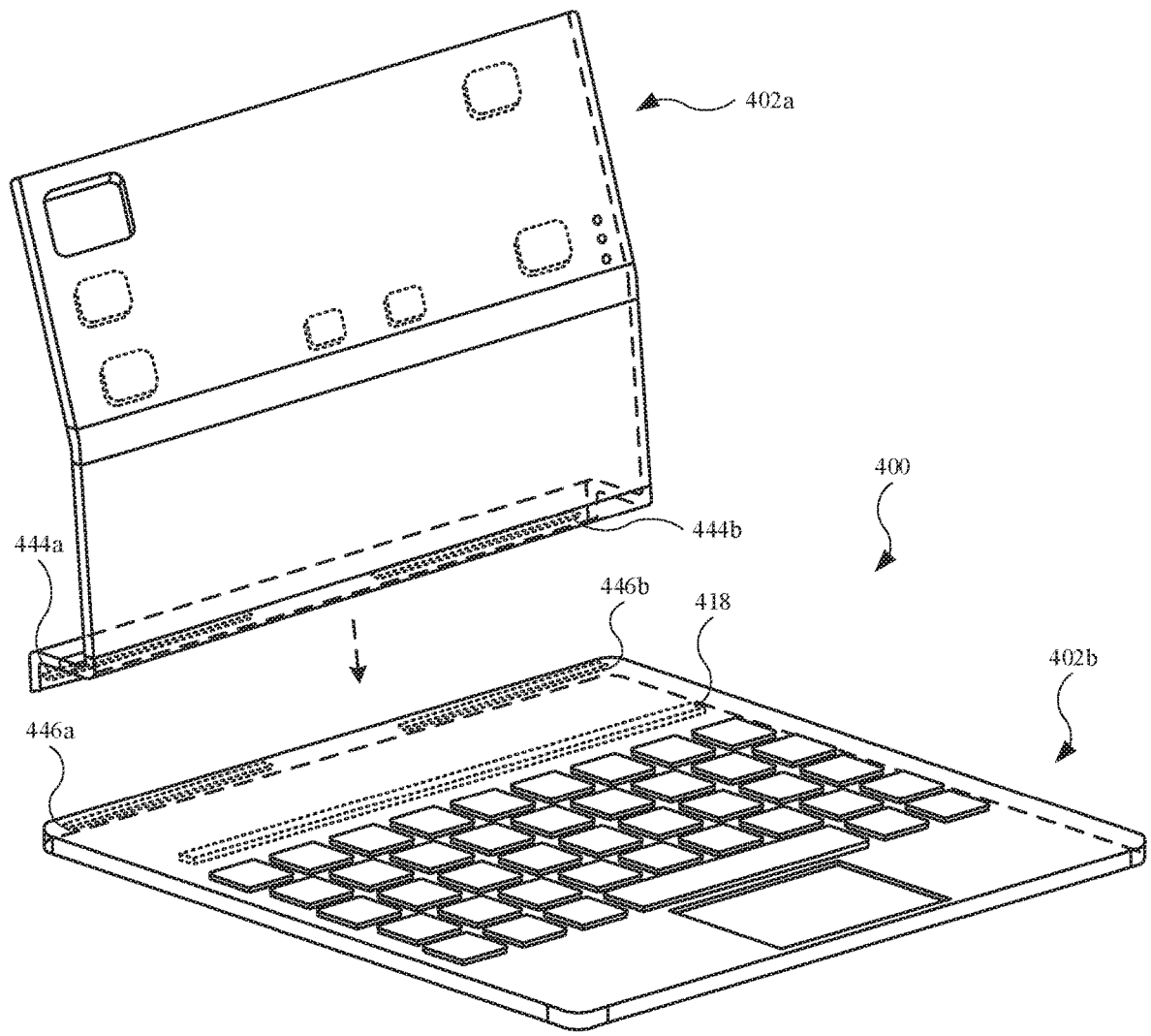
FIG. 9 illustrates an alternate embodiment of an accessory device, showing the accessory device having separable components.

FIG. 9 illustrates an alternate embodiment of an accessory device 400, showing accessory device 400 having separable components. As shown, accessory device 400 includes a section 402a and a section 402b. Sections 402a and 402b may include several features previously shown and described for sections of an accessory device. However, section 402a can be separated from section 402b. As shown, section 402a includes a magnet 444a and a magnet 444b, while section 402b includes a magnet 446a and a magnet 446b. Magnets 444a and 444b are designed to magnetically couple with magnets 446a and 446b, respectively. Despite the aforementioned magnetic couplings, sections 402a and 402b are nonetheless rotationally coupled to each other. Also, section 402b includes a magnetic assembly 418. Although section 402b includes two rows of magnets (defined by magnetic assembly 418 and collectively magnets 446a and 446b), accessory device 400 may rely only on magnetic assembly 418, as opposed to magnets 444a, 444b, 446a, and 446b, to magnetically couple with an electronic device (not shown in FIG. 9). Similar to prior embodiments, magnetic assembly 418 can define, in part, a pivot for an electronic device (not shown in FIG. 9).

Figure 10:
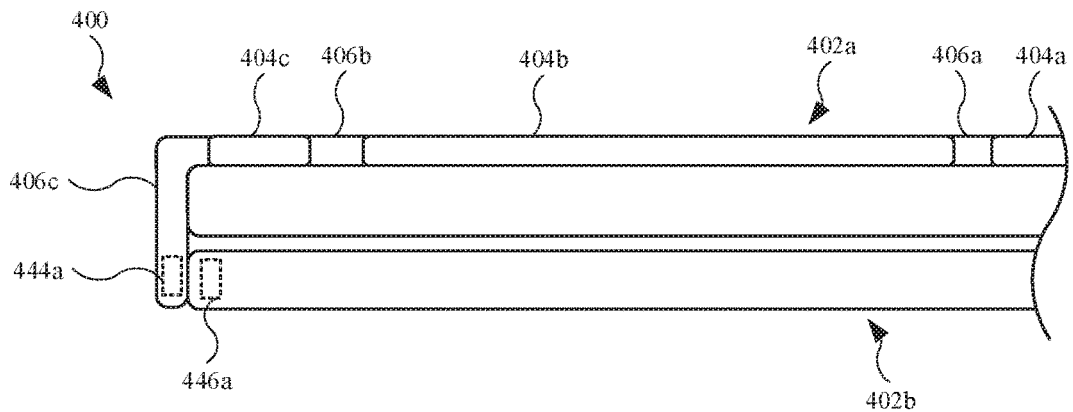
FIG. 10 illustrates a side view of the accessory device shown in FIG. 9, showing additional features of the accessory device.

FIG. 10 illustrates a side view of accessory device 400 shown in FIG. 9, showing additional features of accessory device 400. As shown, section 402a includes a segment 404a, a segment 404b, and a segment 404c. Segments 404a, 404b, and 404c may be referred to as a first segment, a second segment, and a third segment, respectively. In order to provide relative movement to segments 404a, 404b, and 404c, section 402a may include a hinge between segments 404a, 404b, and 404c. For example, section 402a includes a hinge 406a joined with, and between, segments 404a and 404b, as well as a hinge 406b joined with, and between, segments 404b and 404c. Hinges 406a and 406b allow movement/rotation of segments 404a, 404b, and 404c relative to each other. Additionally, accessory device 400 includes a hinge 406c (secured with segment 404c). Magnet 444a and magnet 444b (shown in FIG. 9) may be embedded in hinge 406c. In this regard, magnet 444a and magnet 444b can magnetically couple with magnet 446a and magnet 446b (shown in FIG. 9), respectively, and section 402a is configurable in similar positions shown and described for section 102a (shown in FIGS. 3-5).

Figure 11:
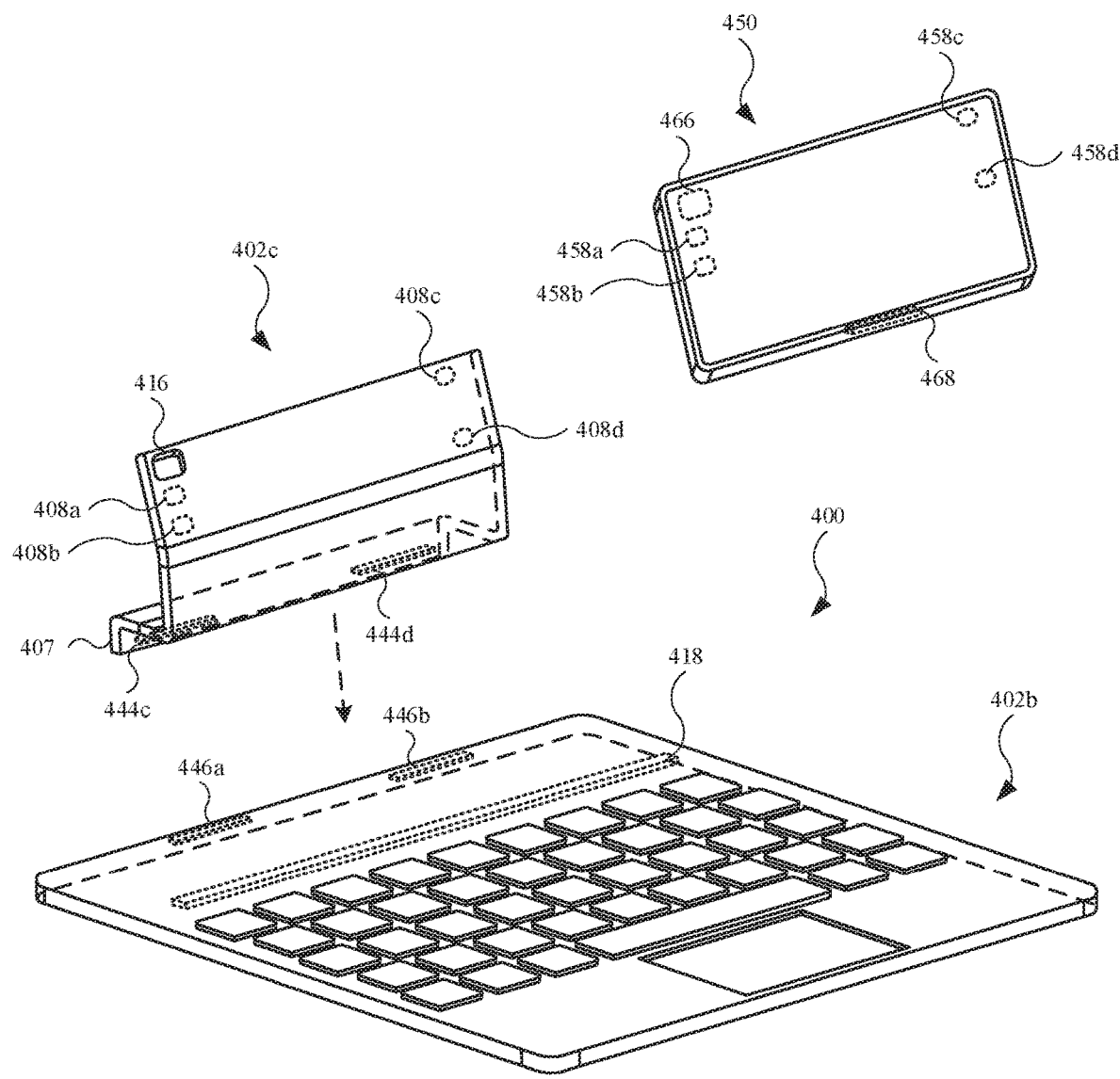
FIG. 11 illustrates an isometric view of the accessory device shown in FIG. 9, showing an alternate component that is compatible with the accessory device, in accordance with some described embodiments.

FIG. 11 illustrates an isometric view of accessory device 400 shown in FIG. 9, showing an alternate component that is compatible with accessory device 400, in accordance with some described embodiments. As shown, accessory device 400 can include a section 402c that substitutes for section 402a (shown in FIG. 9). In other words, accessory device 400 can be defined either by sections 402a and 402b (shown in FIG. 9), or by sections 402b and 402c. However, section 402c includes a size and shape that is designed for an electronic device 450 (which may include a smartphone), whereas section 402a is generally designed for a larger device, such as electronic device 150 (shown in FIG. 2).

Section 402c may generally include any features shown and described for section 402a, including several segments and hinges. For example, section 402c includes a magnet 408a, a magnet 408b, a magnet 408c, and a magnet 408d designed to magnetically couple with a magnet 458a, a magnet 458b, a magnet 458c, and a magnet 458d, respectively, of electronic device 450. Section 402c further includes an opening 416 for a camera assembly 466 of electronic device 450. Also, section 402c includes a magnet 444c and a magnet 444d designed to magnetically couple with magnets 446a and 446b, respectively. Moreover, magnets 444c and 444d may be located in a hinge 407, similar to hinge 406c (shown in FIGS. 9 and 10). In this regard, section 402c is configurable in similar positions shown and described for section 102a (shown in FIGS. 3-5). Further, magnetic assembly 418 of section 402b can magnetically couple with a magnet 468 located in electronic device 450, and allow electronic device 450 to rotate/pivot (similar to prior embodiments). Accordingly, by using either section 402a or section 402c, accessory device 400 is compatible with more than one electronic device, as section 402b can serve as a base unit for different sections.

Figure 12:
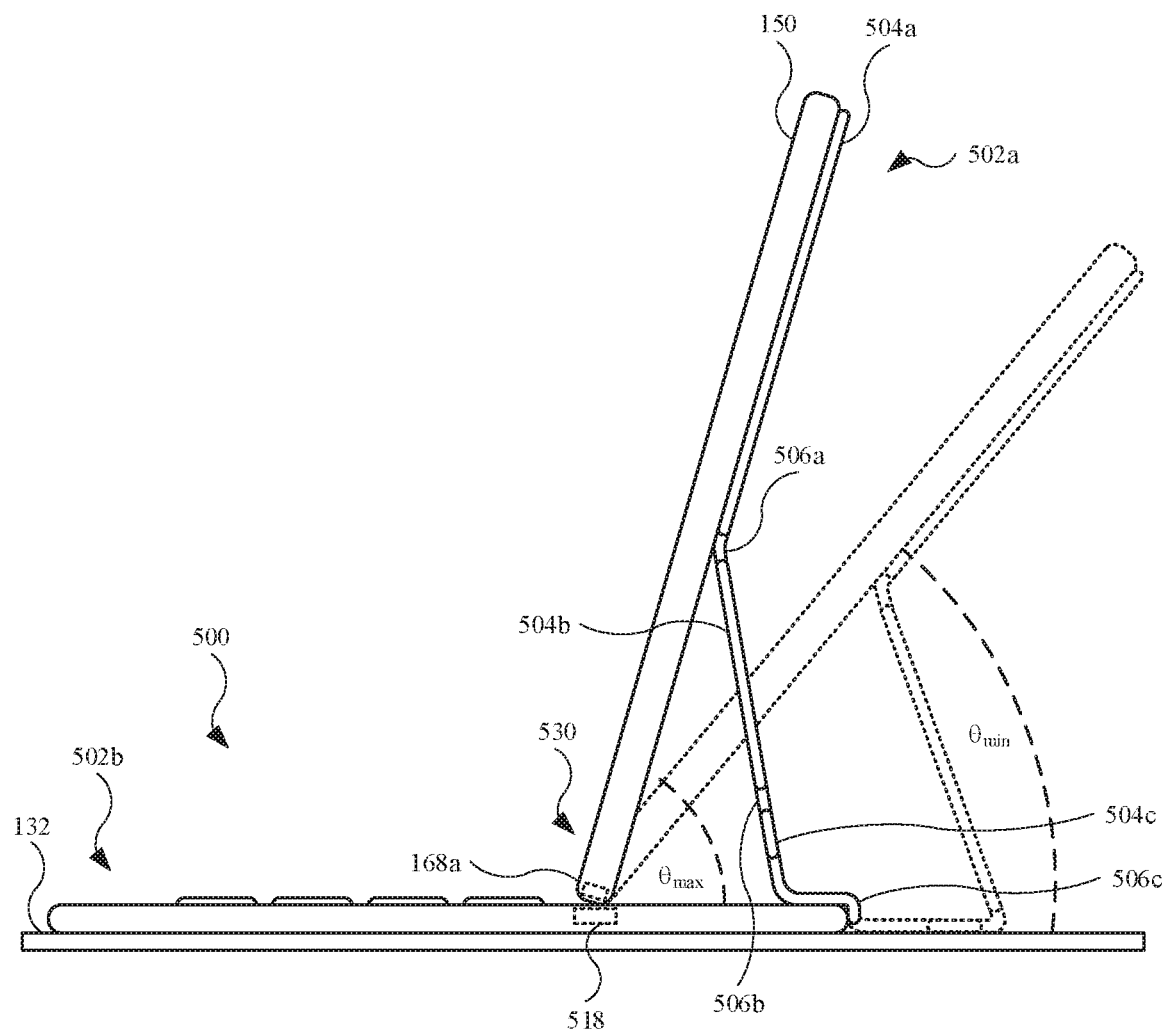
FIG. 12 illustrates a side view of an alternate embodiment of an accessory device, showing the accessory device with one or more friction hinges.

FIG. 12 illustrates a side view of an alternate embodiment of an accessory device 500, showing accessory device 500 with one or more friction hinges. Accessory device 500 may include several features previously described for accessory devices. As a non-limiting example, accessory device 500 includes a section 502a and a section 502b. Section 502a may include a segment 504a, a segment 504b, and a segment 504c. In order to provide relative movement to segments 504a, 504b, and 504c, section 502a may include a hinge between segments 504a, 504b, and 504c. For example, section 502a includes a hinge 506a joined with, and between, segments 504a and 504b, as well as a hinge 506b joined with, and between, segments 504b and 504c. Hinges 506a and 506b allow movement/rotation of segments 504a, 504b, and 504c relative to each other. Additionally, accessory device 500 includes a hinge 506c (secured with segment 504c) that connects section 502a with section 502b, thereby allowing movement/rotation of sections 502a and 502b relative to each other. Also, section 502b includes a magnetic assembly 518 that can magnetically couples with magnet 168a and magnet 168b (shown in FIG. 2).

Unlike prior hinges, at least some of the hinges of accessory device 500 may include one or more features in frictional engagement with each other. For example, hinge 506b may include a friction hinge that provide forces (through frictional engagement) that can hold/support electronic device 150. A friction hinge described herein may include one or more layers of material frictionally engaged with each other. Hinge 506b can provide sufficient frictional forces to support electronic device 500 at angle $\theta_{max}$, representing the largest angle between electronic device 150 and section 502b, as well as at an angle $\theta_{min}$ (shown as dotted lines), representing the smallest angle between electronic device 150 and section 502b, or alternatively, between electronic device 150 and surface 132. Angle $\theta_{min}$ may be approximately in the range of 40 to 59 degrees. Moreover, hinge 506b may provide a stable support angle for electronic device 150 between angles $\theta_{max}$ and $\theta_{min}$. At either of angles $\theta_{max}$ or $\theta_{min}$ (or an angle between angles $\theta_{max}$ and $\theta_{min}$), magnetic assembly 518 defines a pivot 530 for electronic device 150, such that electronic device 500 can be rotated about pivot 530 and maintained at either of angles $\theta_{max}$ or $\theta_{min}$ using hinge 506b. Alternatively or in combination, hinge 506b may include relatively stiff structures, such as a metal layer(s), that provide additional support and stability. Additionally, in some embodiments, hinge 506a may include a friction hinge to support angles $\theta_{max}$ and $\theta_{min}$, or an angle between angles $\theta_{max}$ and $\theta_{min}$.

Figure 13:
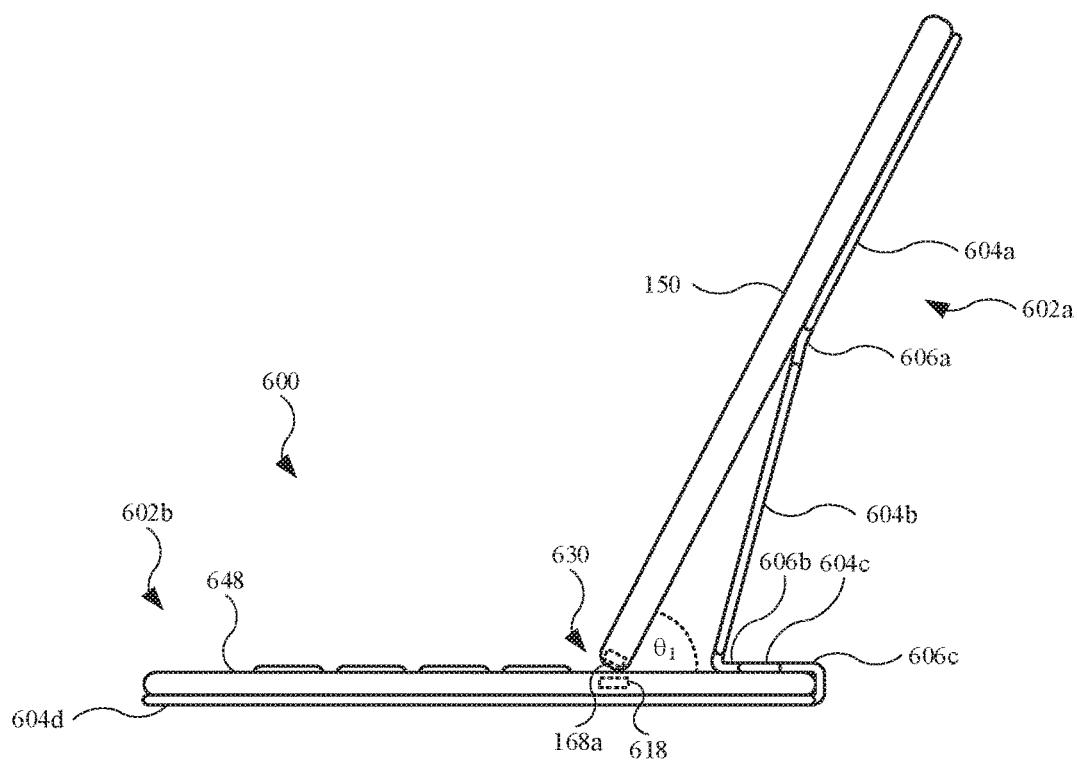
FIG. 13 illustrates a side view of an alternate embodiment of an accessory device, showing accessory device with modular features.

FIG. 13 illustrates a side view of an alternate embodiment of an accessory device 600, showing accessory device 600 with modular features. Accessory device 600 may include several features previously described for accessory devices. As a non-limiting example, accessory device 600 may include a section 602a and a section 602b. Section 602a may include several segments connected together by hinges that allow relative rotational movement. For instance, section 602a includes a segment 604a, a segment, 604b, a segment 604c, and a segment 604d. Also, section 602a includes a hinge 606a that connects segments 604a and 604b together, a hinge 606b that connects segments 604b and 604c together, and a hinge 606c that connects segments 604c and 604d together.

Section 602b may be defined by an input device 648 that includes a keyboard and a trackpad (not labeled). Section 602b includes a magnetic assembly 618 designed to magnetically couple with magnet 168a and magnet 168b (shown in FIG. 2), and still allow electronic device 150 to rotate/ pivot. Accordingly, magnetic assembly 618 defines a pivot 630. As shown, section 602*b* is supported by segment 604*d*. In some embodiments, section 602*b* is permanently coupled with section 602*a*. In the embodiment shown in FIG. 13, section 602*b* (including input device 648) is removable from section 602*a*, and in particular, section 602*b* is removable from segment 604*d*. In this regard, section 602*b* and segment 604*d* may each include magnets designed to magnetically couple with each other in order to retain section 602*b* with segment 604*d*. Moreover, section 602*b* may be replaced with a different section (not shown), such as a section with a different keyboard layout and/or other input mechanisms (e.g., display function row). Alternatively, section 602*b* may be replaced by an electronic device (not shown) that can communicate with electronic device 150. In this regard, segment 604*d* may include electrical contacts similar to electrical contacts 110 (shown in FIG. 1) that electrically couple to the aforementioned additional electronic device, and promote communication with electronic device 150. When segment 604*d* does not include the electrical contacts, electronic device 150 may be in communication with the additional electronic device through wireless communication, such as BLUETOOTH® communication (as a non-limiting example).

Figure 14:
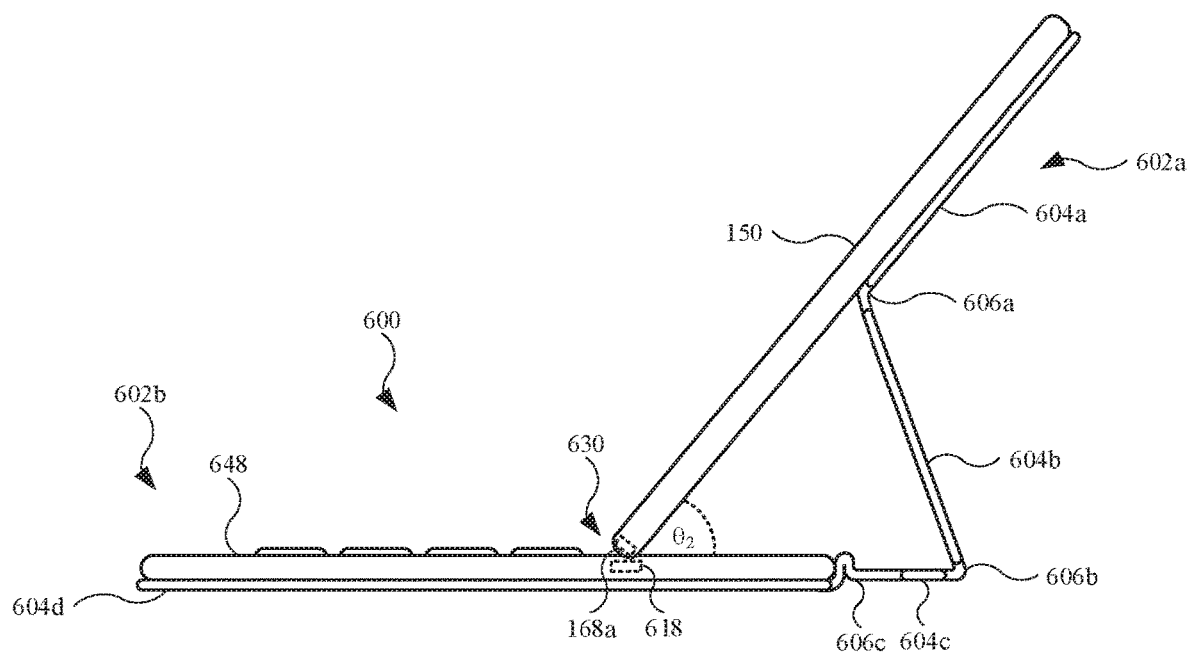
FIG. 14 illustrates a side view of the accessory device shown in FIG. 13, showing the accessory device positioning the electronic device at a different angle.

Also, accessory device 600 may hold electronic device 150 at angle $\theta_1$. However, similar to prior embodiments, other angles are possible. For example, FIG. 14 illustrates a side view of accessory device 600 shown in FIG. 13, showing accessory device 600 positioning electronic device 150 at an angle $\theta_2$ different from angle $\theta_1$. As shown, accessory device 600 allows electronic device 150 to rotate, at pivot 630, from angle $\theta_1$ shown (in FIG. 13) to angle $\theta_2$. Segments 604*a* and 604*b* can be rearranged/repositioned (using hinge 606*a*) to support electronic device 150 at angle $\theta_2$. Additionally, segment 604*c* no longer lies on section 602*b* and may rest on a surface (not shown in FIG. 14). Accordingly, segment 604*c* may be positioned laterally with respect to segment 604*d*.

Figure 15:
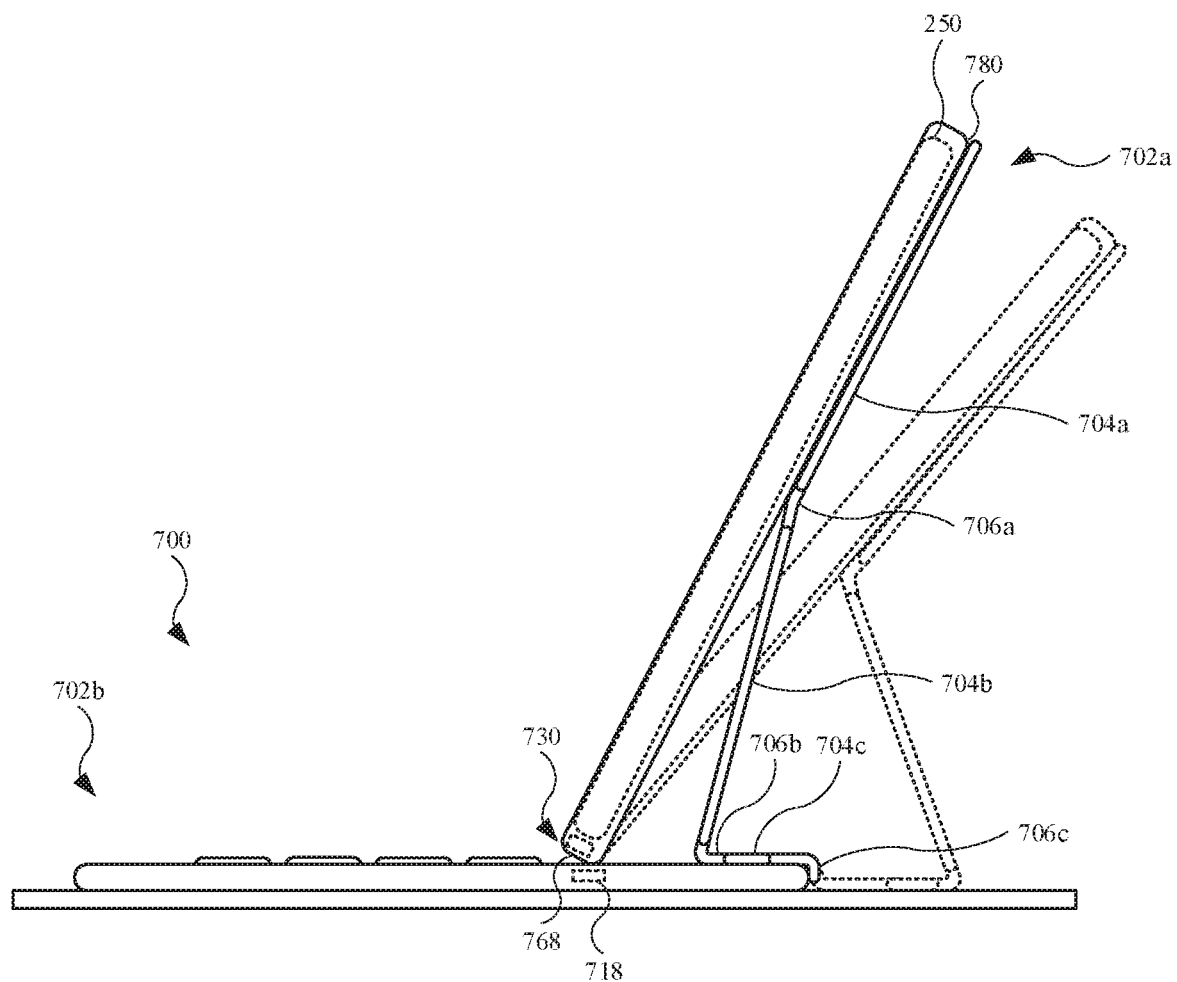
FIG. 15 illustrates a side view of an alternate embodiment of an accessory device, the showing accessory device coupled with a case that holds the electronic device.

FIG. 15 illustrates a side view of an alternate embodiment of an accessory device 700, showing accessory device 700 coupled with a case 780 that holds an electronic device 250. Electronic device 250 may include features previously described for electronic device 150 (shown in FIG. 2). As shown, case 780 defines a receptacle that receives electronic device 250.

Accessory device 700 may include several features previously described for accessory devices. As a non-limiting example, accessory device 700 includes a section 702*a* and a section 702*b*. Section 702*a* may include a segment 704*a*, a segment 704*b*, and a segment 704*c*. In order to provide relative movement to segments 704*a*, 704*b*, and 704*c*, section 702*a* may include a hinge between segments 704*a*, 704*b*, and 704*c*. For example, section 702*a* includes a hinge 706*a* joined with, and between, segments 704*a* and 704*b*, as well as a hinge 706*b* joined with, and between, segments 704*b* and 704*c*. Hinges 706*a* and 706*b* allow movement/rotation of segments 704*a*, 704*b*, and 704*c* relative to each other. Additionally, accessory device 700 includes a hinge 706*c* (secured with segment 704*c*) that connects section 702*a* with section 702*b*, thereby allowing movement/rotation of sections 702*a* and 702*b* relative to each other. In some embodiments, case 780 is permanently coupled with segment 704*a* and electronic device 250 is removable from case 780. In the embodiment shown in FIG. 15, case 780 defines a permanent cover or "sleeve" for electronic device 250, and further, case 780 can be coupled with segment 704*a* by one or more magnets (not shown in FIG. 15). In this regard, the combination of electronic device 250 and case 780 can be detached from segment 704*a* if desired.

Also, section 702*b* includes a magnetic assembly 718. As shown, case 780 includes a magnet 768 (representing one or more magnets) that can magnetically couple with magnet assembly 718. Similar to prior embodiments, magnetic assembly 718 defines a pivot 730 for electronic device 250 and case 780, such that electronic device 700 can be rotated about pivot 730 and maintained in accordance with at least two different angles (as illustrated by solid and dotted lines). The two angles may be similar to angles $\theta_1$ and $\theta_2$ (shown in FIGS. 3 and 4, respectively).

Figure 16:
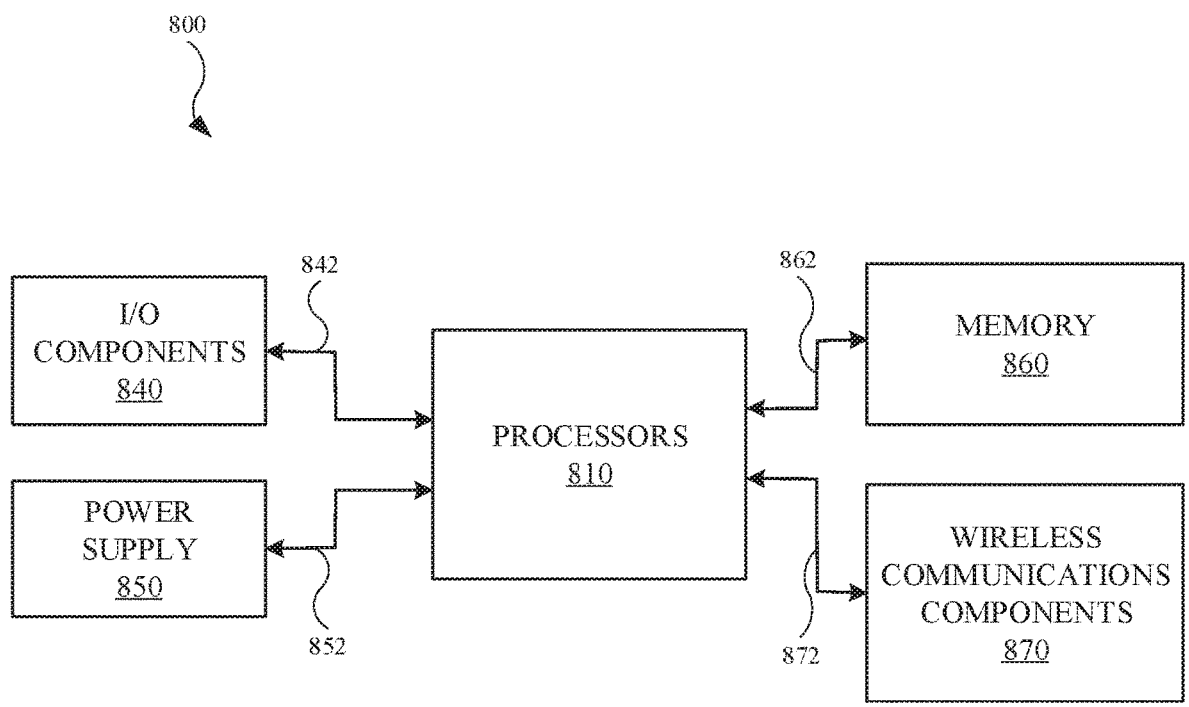
FIG. 16 illustrates a block diagram of an accessory device, in accordance with some described embodiments.

FIG. 16 illustrates a block diagram of an accessory device 800, in accordance with some described embodiments. The features in accessory device 800 may be present in other accessory devices described herein. Accessory device 800 may include one or more processors 810 for executing functions of the accessory device 800. One or more processors 810 can refer to at least one of a central processing unit (CPU) and at least one microcontroller for performing dedicated functions. Also, one or more processors 810 can refer to application specific integrated circuits.

According to some embodiments, accessory device 800 can include one or more input/output components 840. In some cases, the one or more input/output components 840 can refer to a button (e.g., keys of a keyboard) or a trackpad is capable of actuation by the user. When one or more input/output components 840 are used, one or more input/output components 840 can generate an electrical signal that is provided to one or more processors 810 via one or more electrical connections 842.

According to some embodiments, accessory device 800 can include a power supply 850 that is capable of providing energy to the operational components of accessory device 800. In some examples, power supply 850 can refer to a rechargeable battery. Power supply 850 can be connected to one or more processors 810 via one or more electrical connections 852. The power supply 850 can be directly connected to other devices of accessory device 800, such as one or more input/output components 840. In some examples, accessory device 800 can receive power from another power sources (e.g., an external charging device).

According to some embodiments, the accessory device 800 can include memory 860, which can include a single disk or multiple disks (e.g., hard drives), and includes a storage management module that manages one or more partitions within memory 860. In some cases, memory 860 can include flash memory, semiconductor (solid state) memory or the like. Memory 860 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of the accessory device 800. In some embodiments, memory 860 refers to a non-transitory computer readable medium. One or more processors 810 can also be used to execute software applications. In some embodiments, one or more electrical connections 862 can facilitate data transfer between memory 860 and one or more processors 810.

According to some embodiments, accessory device 800 can include wireless communications components 870. A network/bus interface 872 can couple wireless communications components 870 to one or more processors 810. Wireless communications components 870 can communicate with other accessory devices via any number of wireless communication protocols, including at least one of a global network (e.g., the Internet), a wide area network, a local area network, a wireless personal area network (WPAN), or the like. In some examples, the wireless communications components 870 can communicate using NFC protocol, BLUETOOTH® protocol, or WIFI® protocol.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An accessory device suitable for use with an electronic device, the accessory device comprising:
   a first section configured to support the electronic device and provide a first support angle and a second support angle different from the first support angle, the first section comprising:
      a first segment comprising a magnetic element configured to magnetically couple with a second magnet of the electronic device;
      a second segment rotationally coupled to the first segment by a first hinge; and
         a third segment rotationally coupled to the second segment by a second hinge; and
   a second section rotationally coupled with the first section, the second section comprising:
      a surface;
      a keyboard, and
      a magnetic assembly comprising magnets, the magnetic assembly configured to magnetically couple with a magnet of the electronic device while the first section supports the electronic device at the first support angle and the second support angle, wherein:
         at the first support angle, the third segment is positioned on the second section, and
         at the second support angle, the third segment is positioned laterally with respect to the second section.

2. The accessory device of claim 1, wherein:
   the second section comprises a channel, and
   the magnetic assembly is covered by the channel.

3. The accessory device of claim 1, wherein the magnetic assembly defines a pivot, and when the magnetic assembly is magnetically coupled to the magnet of the electronic device, the pivot allows the electronic device to rotate, at the pivot, while the first section transitions from the first support angle to the second support angle, or vice versa.

4. The accessory device of claim 1, wherein the first segment is larger than the second segment, and the second segment is larger than the third segment.

5. The accessory device of claim 1, wherein the second section further comprises a trackpad.

6. The accessory device of claim 1, further comprising a third hinge connected to the third segment and the second section, wherein the third hinge is removable from the second section.

7. The accessory device of claim 1, wherein:
   the second section comprises a channel, and
   the magnetic assembly comprises a tapered magnet covered by the channel.

8. An accessory device suitable for use with an electronic device, the accessory device comprising:
   a first section configured to support the electronic device and provide a first support angle and a second support angle different from the first support angle, the first section comprising:
      a first segment comprising a magnetic element configured to magnetically couple with a second magnet of the electronic device;
      a second segment rotationally coupled to the first segment by a first hinge; and
      a third segment rotationally coupled to the second segment by a second hinge; and
   a second section coupled with the first section, the second section comprising:
      a surface;
      a keyboard extending from the surface; and
      a magnetic assembly covered by the surface, the magnetic assembly configured to magnetically couple with a magnet of the electronic device and define a pivot point, wherein the second section allows the electronic device to engage the surface and rotate, at the pivot point, from the first support angle to the second support angle, wherein at the first support angle comprises at least one of the first segment, the second segment, or the third segment lies on the surface,
   wherein:
      the first support angle comprises the third segment positioned on the second section, and
      the second support angle comprises the third segment positioned laterally with respect to the second section.

9. The accessory device of claim 8, wherein the first section further comprises:
   electrical contacts configured to electrically couple to device contacts of the electronic device;
   magnets configured to magnetically couple with device magnets of the electronic device; and
   an opening for a camera assembly of the electronic device.

10. The accessory device of claim 8, wherein the first segment is larger than the second segment, and the second segment is larger than the third segment.

11. The accessory device of claim 8, further comprising a third hinge connected to the third segment and the second section, wherein the first section is rotationally coupled to the second section based on the third hinge.

12. The accessory device of claim 8, wherein the magnetic assembly defines a single row of magnets.

13. An accessory device suitable for use with an electronic device, the accessory device comprising:
- a first section configured to support the electronic device and provide a first support angle and a second support angle different from the first support angle, the first section comprising:
  - a first segment that defines a first size;
  - a second segment rotationally coupled to the first segment by a first hinge, the second segment defining a second size different from the first size, and
  - a third segment rotationally coupled to the second segment by a second hinge, the third segment defining a third size different from the first size and the second size; and
- a second section rotationally coupled with the first section, the second section comprising a magnetic assembly that magnetically couples with a magnet of the electronic device at the first support angle and the second support angle, wherein:
  - at the first support angle, the third segment is positioned on the second section, and
  - at the second support angle, the third segment is positioned laterally with respect to the second section.

14. The accessory device of claim 13, further comprising a third hinge connected to the third segment and the second section, wherein the first section is rotationally coupled to the second section based on the third hinge.

15. The accessory device of claim 13, wherein the magnetic assembly defines a pivot, and when the magnetic assembly is magnetically coupled to the magnet of the electronic device, the pivot allows the electronic device to rotate while the first section transitions from the first support angle to the second support angle, or vice versa.

16. The accessory device of claim 13, wherein:
the first size includes a first surface area, and
the second size includes a second surface area less than the first surface area.

17. The accessory device of claim 16, wherein the third size includes a third surface area less than the second surface area.

18. The accessory device of claim 13, further comprising a third hinge connected to the third segment and the second section, wherein the third hinge is removable from the second section.

* * * * *